United States Patent [19]

Durand

[11] Patent Number: 5,334,631

[45] Date of Patent: Aug. 2, 1994

[54] POWDER COATING COMPOSITION CONTAINING A RESIN, A CURING AGENT AND ZINC

[75] Inventor: Dominique Durand, Etrechy, France

[73] Assignee: Akzo N.V., Netherlands

[21] Appl. No.: 918,320

[22] Filed: Jul. 21, 1992

[30] Foreign Application Priority Data

Jul. 22, 1991 [EP] European Pat. Off. ........ 91201919.7

[51] Int. Cl.⁵ .................. C08K 3/08; C08L 63/00; C08L 63/04
[52] U.S. Cl. .................... 523/459; 428/416; 524/439; 524/904; 525/934
[58] Field of Search ............ 523/459; 524/904, 439; 428/416; 525/934

[56] References Cited

U.S. PATENT DOCUMENTS

| | | | |
|---|---|---|---|
| 3,170,890 | 2/1965 | Boyd | 523/435 |
| 3,408,318 | 10/1968 | Madison | 523/459 |
| 3,770,482 | 11/1973 | Millar et al. | 117/17 |
| 3,939,020 | 2/1976 | Caramanian et al. | 156/64 |
| 4,093,571 | 6/1978 | Gordon | 524/904 |
| 4,186,036 | 1/1980 | Elms | 428/416 |
| 4,352,899 | 10/1982 | Tada | 523/459 |
| 4,381,334 | 4/1983 | Balk et al. | 428/332 |
| 4,757,117 | 7/1988 | Moss | 525/934 |
| 5,001,173 | 3/1991 | Anderson | 523/459 |
| 5,043,401 | 8/1991 | Matsuzaki | 525/934 |
| 5,077,355 | 12/1991 | Nagase | 525/934 |

FOREIGN PATENT DOCUMENTS 3018765 11/1981 Fed. Rep. of Germany .
3704479  8/1988 Fed. Rep. of Germany .

OTHER PUBLICATIONS

H. Lee and K. Neville "Handbook of Epoxy Resins", McGraw-Hill Book Co., New York pp. 4–58 to 4–70 (1907).

Mitterberger and Rassaerts, *Farbe und Lacke,* 74, No. 6 (1968), pp. 568-571.

European Search Report, dated: Mar. 10, 1992.

"Nouveaux Systems Anti-Corrosion A Base De Pigments De Zinc Lamellaire", *Eckart-Werke Report,* by Dr. Robert Besold (Fureth/Bavaria).

*Primary Examiner*—John C. Bleutge
*Assistant Examiner*—D. R. Wilson
*Attorney, Agent, or Firm*—James K. Poole; Louis A. Morris

[57] ABSTRACT

The present invention relates to an improved powder coating composition comprising (a) a resin, (b) a curing agent and (c) zinc, wherein the zinc is a mixture of (c1) lamellar zinc and (c2) zinc dust.

9 Claims, No Drawings

POWDER COATING COMPOSITION CONTAINING A RESIN, A CURING AGENT AND ZINC

BACKGROUND OF THE INVENTION

1. Field of the Invention

The invention relates to a powder coating composition comprising (a) a resin, (b) a curing agent and (c) zinc.

2. Description of the Prior Art

Such compositions are generally well-known in the art. See, for example, U.S. Pat. No. 4,381,334 and DE-A-3,018,765, both of which are incorporated by reference herein for all purposes.

In U.S. Pat. No. 4,381,334, 75–90% by weight of zinc dust are extruded with a thermosetting binder (an epoxy resin) and, optionally, a curing agent therefor. In DE-A-3,018,765, 60–90% by weight zinc dust are extruded with the thermosetting binder and at least an extra 2–25% by weight zinc dust are then admixed to the ground extrudate. These powder coatings are applied as corrosion protective films.

A disadvantage of these compositions is the appearance of segregation between the resin and zinc dust as indicated by DE-A-3,018,765.

SUMMARY OF THE INVENTION

It is, therefore, an object of the invention to provide a powder coating composition containing a resin, for example an epoxy resin, a curing agent and zinc which combines good corrosion protective properties and good film properties.

The present invention is characterized in that the zinc of the coating composition is a mixture of (c1) lamellar zinc and (c2) zinc dust.

By using the mixture of zinc dust and lamellar zinc the problem of segregation is very limited because the two zinc components can be totally extruded. The presence of lamellar zinc results in good film properties in combination with good corrosion protective properties. The present composition also shows good mechanical properties and good adhesion properties. The film properties are comparable to wet zinc containing coatings or coatings obtained by metal-sprayed zinc.

According to a preferred embodiment of the invention the powder coating composition contains 10–35% by weight lamellar zinc and 10–35% by weight zinc dust. More preferably the composition contains 20–30% by weight lamellar zinc and 20–30% by weight zinc dust. Percent by weight is based upon the combined weight of components (a), (b) and (c).

DETAILED DESCRIPTION OF THE INVENTION

The powder coating composition according to the invention is preferably based on an epoxy resin. Other suitable resins are in general well-known in the art and include polyesters, polyacrylates, and/or polyurethanes. Mixtures of these resins with epoxy resins, such as epoxy resin-polyester resin mixtures, are also suitable. Such powder coating resins are, again, in general well-known in the art.

According to a further preferred embodiment of the invention the composition comprises:

a+b) 30–70% by weight epoxy resin and curing agent, c1) 10–35% by weight lamellar zinc and c2) 10–35% by weight zinc dust.

Zinc dust also includes zinc powder. Zinc dust and zinc powder are particulate forms of zinc. These terms have been used more or less indiscriminately to designate particulate zinc materials. Relatively, zinc dust is smaller in particle size and spherical in shape, whereas zinc powder is coarser in size and irregular in shape.

A suitable zinc dust product can have a particle size between 2 and 500 $\mu$m. The apparent density can be for example between 1 and 4 kg/l.

Zinc dust can contain minor amounts, preferably less than 4% by weight, more preferably less than 1.4% by weight (based upon the weight of the zinc dust) of other components such as for example lead, cadmium, copper chloride and/or iron.

Lamellar zinc is characterized by a rather large ratio of the average flake diameter to thickness. A suitable lamellar zinc product can, for example, be characterized as follows:

volatile content: 8±2% (DIN 55923)

screen analysis: <45 $\mu$m, min. 98% (DIN 53196)

micro sieving: <20 $\mu$m, min 87% specific gravity: 3.4 kg/l average particle size distribution: $d_{10}$ 4 $\mu$m $d_{50}$ 14 $\mu$m $d_{90}$ 34 $\mu$m Preferably a solvent is added to wet the lamellar zinc. A suitable solvent is for example white spirit (petroleum fraction intermediate between gasoline and kerosene, boiling range 150°–200° C.). The solvent can be added in amounts between 1 and 15% by weight, preferably between 6 and 11% by weight and more preferably between 9 and 10% by weight (based upon the weight of the lamellar zinc), to the lamellar zinc.

The process for preparing the composition according to the invention includes by preference the following steps: weighing of raw materials, next premixing of raw materials, then an extrusion process, followed by the grinding process and the storage. The zinc mixture is preferably added at first and included in the premix of raw materials.

Suitable epoxy resins are for example epoxy resins based on epichlorohydrin and 2,2-bis-(4-hydroxyphenol)-propane with softening points of between 40° C. and 90° C. and an epoxy equivalent weight of between 450–2000. The softening point is particularly between 50° and 70° C. Other suitable epoxy resins are, for example, epoxidized phenol-novolac resins with an epoxy weight equivalent of between 160 and 250 and with a softening point of between 40° C. and 90° C. The softening point is preferably between 50° C. and 70° C. Preferably a diglycidyl ether of bisphenol-A (DGEBA) novalac modified epoxy resin is used.

Suitable curing agents for epoxy resins are for instance, dicyandiamide, imidazole derivatives and imidazoline derivatives, acid anhydrides of trimellitic acid, pyromellitic acid, benzophenonetetracarboxylic acid, tetrahydrophthalic acid, cyclopentanedicarboxylic acid, hexahydrophthalic acid, partly esterified adducts of said carboxylic acids, aromatic amines, phenolic resins (resol or novolac) and epoxy resin-phenol adducts, alone or in combination.

The curing agents can be applied in amounts between 5 and 30% by weight (based upon the weight of the resin).

The coating composition can also contain, for example, fillers, flow-promoting agents and pigments.

Suitable fillers are generally well-known in the art and include quartz powder, aluminum-, calcium- and magnesium silicates, calcium carbonate, barium sulphate, calcium sulphate and aluminum oxide, mixtures of these, optionally with smaller amounts of e.g. aluminum hydroxide, ammonium polyphosphate and the like.

Flow-promoting agents are also well-known in the art and include, by preference, liquid polyacrylates, such as, for instance, polybutylacrylate and polyethylacrylate. Other suitable flow-promoting agents include fluorinated polymers such as, for instance, esters of polyethylene glycol and perfluoroctanoic acid, and polymeric siloxanes such as, for instance, polydimethyl siloxane or polymethylphenyl siloxane.

The composition according to the invention can also contain silica-containing additives to improve the corrosion protective properties. A suitable compound is "Shieldex" (ex Grace) which can be applied in amounts between for example 2 and 30% by weight (based upon the total weight of the zinc).

Suitable pigments are, for instance, titanium dioxide, iron oxide (yellow, brown, red, black), carbon black and organic pigments.

If so desired, other well-known additives such as accelerators, release agents and viscosity reducing agents, may also be used.

The obtained powder coatings are especially suitable for application to metals such as iron, steel, copper, aluminum and the like. It is, however, also possible to apply the present coatings to carbon, wood, glass and polymers.

A variety of methods can be used to apply the compositions to various articles and substrates. These methods include flame spraying, (electrostatic) fluidized bed methods, electrostatic spraying, plasma spraying and tribocharging methods.

Electrostatic powder or tribo spraying methods charge the particles with the aid of a powder gun and spray them towards a grounded steel substrate. Because the powder is not conductive, the particles stick on the metal due to electrostatic attraction forces. The object can then be placed in an oven for curing of the powder coating.

The fluidized bed method is quite simple and can best be described as a "hot dip process". A preheated object is dipped in a fluidized bed of powder. The powder sticks and melts on the metal surface. After dipping the object is put in an oven for curing.

Preferably the coating composition according to the invention is applied to a sand blasted or chemically treated substrate in a layer thickness which is preferably between 40 and 60 μm. Before or after curing of this layer a second layer is applied as a topcoat coating in a layer thickness which is preferably between 60 and 80 μm. The second layer is preferably a powder coating composition based on a polyester resin as binder and an epoxy group containing component, such as tris-glycidylisocyanurate, as curing agent.

In general after applying uncured powder coating on steel or other materials, the powder coating is cured. Curing temperatures and times can vary from, for example, 160° C. to 220° C. and 1 minute to 15 minutes. On curing the powder particles will start to melt and fuse together. As the temperature rises so the viscosity drops, giving the coating flowing opportunity. The process continues until the curing agent starts crosslinking with the resin, and then the viscosity will rapidly increase. It is important for good flow and minimal "orange peel" that rapid heating occurs. The cure time and temperature have considerable influence on the mechanical properties.

The invention will be further illustrated by the following examples:

EXAMPLES

Example I

Preparation of the Powder Coating Composition 25 parts by weight zinc dust (standard zinc powder, ex Vieille-Montagne), 25 parts by weight lamellar zinc (Ecka-4 ex Eckart) and 50 parts by weight of a DGEBA novolac modified epoxy resin with phenolic hardener (weight ratio resin: hardener 7:3) were mixed at a temperature of 100° C. in an extruder. After addition of 0.1% by weight pyrogenic silica, the grinding process followed.

Example II

Protection of the Outside of a Gas Tank

First the steel of the tank was sandblasted. Next the tank was preheated to 240° C. After that the powder coating composition obtained according to Example I was electrostatic applied in a layer thickness of 50 μm. Next the second layer consisting of a composition containing a polyester resin and TGIC crosslinker in a weight ratio 93:7 was applied in a layer thickness of 70 μm. The curing took place at a temperature of 180° C. during 10 minutes.

The corrosion resistance was determined by the ability of the coating to retain adhesion while subjected to corrosive salt spray (SIO 1456, ASTM B 117). After 1000 hours of exposure no loss of adhesion was reported. Also no blistering had been reported.

The Erichsen slow penetration test (ISO 1520; determination of the flexibility) resulted in 4 mm.

The determination of the adhesion properties (ISO 2409) resulted in GT-0 which means that there was no loss of adhesion. The impact resistance (ISO 6272) was 0.5 kg/m.

It was concluded that a powder coating composition of the invention resulted in a combination of good corrosion protective properties and good film properties.

I claim:

1. An anticorrosive powder coating composition consisting essentially of (a) a resin, (b) a curing agent and (c) zinc, wherein the zinc is a mixture of (c1) about 10–35% by weight lamellar zinc and (c2) about 10–35% by weight zinc dust, percent by weight being based upon the total weight of (a), (b) and (c).

2. The powder coating composition according to claim 1, wherein said zinc consists essentially of about 20–30% by weight lamellar zinc and about 20–30% by weight zinc dust.

3. The powder coating composition according to claim 1 wherein components (a) and (b) consist essentially of: 30–70% by weight of the resin and curing agent.

4. The powder coating composition according to claim 1, wherein the resin comprises an epoxy resin.

5. The powder coating composition according to claim 4, wherein the epoxy resin comprises an epoxidized phenol-novolac resin.

6. The powder coating composition according to claim 1, wherein the lamellar zinc is wetted with a solvent.

7. In an anticorrosive powder coating composition consisting essentially of (a) a resin, (b) a curing agent and (c) zinc, the improvement being wherein said 10–35 wt. % of the total composition of zinc consisting essentially of a mixture of 10–35 wt. % of the total composition of zinc dust and lamellar 10–35 wt. % of the total composition of zinc.

8. The powder coating composition according to claim 7 which consists essentially of from 30 to 70% by weight of resin and curing agent, from 10 to 35% by weight lamellar zinc and from 10 to 35% by weight zinc dust, percent by weight being based upon the total weight of these components.

9. The powder coating composition according to claim 8 which consists essentially of from 20 to 30% by weight lamellar zinc and from 20 to 30% by weight zinc dust.

* * * * *